United States Patent
Polonsky et al.

(10) Patent No.: US 9,477,672 B2
(45) Date of Patent: Oct. 25, 2016

(54) IMPLICIT PROFILE FOR USE WITH RECOMMENDATION ENGINE AND/OR QUESTION ROUTER

(71) Applicant: Gartner, Inc., Stamford, CT (US)

(72) Inventors: Nir Polonsky, Ridgefield, CT (US); Girish Malangi, Bridgewater, NJ (US)

(73) Assignee: Gartner, Inc., Stamford, CT (US)

( * ) Notice: Subject to any disclaimer, the term of this patent is extended or adjusted under 35 U.S.C. 154(b) by 73 days.

(21) Appl. No.: 14/533,398

(22) Filed: Nov. 5, 2014

(65) Prior Publication Data

US 2015/0058380 A1    Feb. 26, 2015

Related U.S. Application Data

(63) Continuation-in-part of application No. 13/532,936, filed on Jun. 26, 2012, now Pat. No. 8,918,391, which is a continuation-in-part of application No. 12/592,799, filed on Dec. 2, 2009, now Pat. No. 8,244,674.

(60) Provisional application No. 61/601,085, filed on Feb. 21, 2012.

(51) Int. Cl.
*G06F 17/30* (2006.01)
*H04L 29/08* (2006.01)
*G06Q 30/02* (2012.01)
*G06Q 10/10* (2012.01)
*G06Q 50/00* (2012.01)

(52) U.S. Cl.
CPC ... *G06F 17/30091* (2013.01); *G06F 17/30206* (2013.01); *G06F 17/30386* (2013.01); *G06F 17/30654* (2013.01); *G06Q 10/10* (2013.01); *G06Q 30/0269* (2013.01); *H04L 67/22* (2013.01); *H04L 67/306* (2013.01); *G06Q 50/01* (2013.01); *Y10S 707/967* (2013.01)

(58) Field of Classification Search
CPC .................. G06F 17/30091; G06F 17/30206; G06F 17/30654; G06F 17/30386; G06Q 30/0269; G06Q 50/01; H04L 67/306; H04L 67/22

See application file for complete search history.

(56) References Cited

U.S. PATENT DOCUMENTS

| | | |
|---|---|---|
| 5,983,214 A | 11/1999 | Lang et al. |
| 6,029,161 A | 2/2000 | Lang et al. |
| 6,078,928 A | 6/2000 | Schnase et al. |
| 6,112,186 A | 8/2000 | Bergh et al. |
| 6,175,842 B1 | 1/2001 | Kirk et al. |
| 6,236,978 B1 | 5/2001 | Tuzhilin |
| 6,236,980 B1 | 5/2001 | Reese |
| 6,266,649 B1 | 7/2001 | Linden et al. |
| 6,308,175 B1 | 10/2001 | Lang et al. |
| 6,314,420 B1 | 11/2001 | Lang et al. |
| 6,389,372 B1 | 5/2002 | Glance et al. |

(Continued)

*Primary Examiner* — Leslie Wong
(74) *Attorney, Agent, or Firm* — Lipsitz & McAllister, LLC

(57) ABSTRACT

Methods and systems for creating an implicit profile for use by a recommendation engine or a question router is provided. User behavior on at least one of one or more electronic devices and an electronic communications network is tracked. User-related information relating to the user behavior is analyzed to extract or derive key words therefrom. The key words are stored in a profiles database as the implicit profile and used by the recommendation engine or question router to characterize user interests, expertise, and skills when matching a request from a querying user to a potential user or group of users having the relevant background to respond to the request.

21 Claims, 10 Drawing Sheets

(56) References Cited

U.S. PATENT DOCUMENTS

| | | |
|---|---|---|
| 6,981,214 B1 | 12/2005 | Miller et al. |
| 7,016,307 B2 | 3/2006 | Vasudev et al. |
| 7,035,838 B2 | 4/2006 | Nelson et al. |
| 7,043,443 B1 | 5/2006 | Firestone |
| 7,047,202 B2 | 5/2006 | Jaipuria et al. |
| 7,069,308 B2 | 6/2006 | Abrams |
| 7,167,910 B2 | 1/2007 | Farnham et al. |
| 7,177,880 B2 | 2/2007 | Ruvolo et al. |
| 7,188,153 B2 | 3/2007 | Lunt et al. |
| 7,249,123 B2 | 7/2007 | Elder et al. |
| 7,269,590 B2 | 9/2007 | Hull et al. |
| 7,275,102 B2 | 9/2007 | Yeager et al. |
| 7,315,826 B1 | 1/2008 | Guheen et al. |
| 7,359,894 B1 | 4/2008 | Liebman et al. |
| 7,451,161 B2 | 11/2008 | Zhu et al. |
| 7,454,433 B2 | 11/2008 | Ebert |
| 7,499,903 B2 | 3/2009 | Nevin et al. |
| 7,506,001 B2 * | 3/2009 | Johnson ............... G06Q 10/06 705/37 |
| 7,512,628 B2 | 3/2009 | Chess et al. |
| 7,657,907 B2 | 2/2010 | Fennan et al. |
| 7,680,820 B2 | 3/2010 | Denoue et al. |
| 7,917,503 B2 | 3/2011 | Mowatt et al. |
| 7,966,316 B2 | 6/2011 | Cao et al. |
| 8,184,797 B1 * | 5/2012 | Rosen ............... H04M 3/4931 379/218.01 |
| 8,311,835 B2 | 11/2012 | Lecoeuche |
| 8,661,034 B2 | 2/2014 | Polonsky et al. |
| 8,903,811 B2 * | 12/2014 | Hueter ............... G06Q 10/00 707/723 |
| 8,918,391 B2 * | 12/2014 | Polonsky ............ G06Q 10/10 707/732 |
| 9,143,578 B2 * | 9/2015 | Fourman ............ G06Q 30/02 |
| 9,165,305 B1 | 10/2015 | Chandra et al. |
| 9,235,848 B1 * | 1/2016 | Gourley ............ G06Q 30/0209 |
| 2002/0087632 A1 | 7/2002 | Keskar |
| 2002/0194018 A1 | 12/2002 | Scott |
| 2003/0093294 A1 | 5/2003 | Passantino |
| 2004/0015329 A1 | 1/2004 | Shayegan et al. |
| 2004/0024739 A1 * | 2/2004 | Copperman ...... G06F 17/30616 |
| 2004/0073918 A1 | 4/2004 | Ferman et al. |
| 2005/0050227 A1 | 3/2005 | Michelman |
| 2005/0182743 A1 | 8/2005 | Koenig |
| 2005/0240580 A1 | 10/2005 | Zamir et al. |
| 2006/0085373 A1 | 4/2006 | Dhillion et al. |
| 2006/0179112 A1 | 8/2006 | Weyer et al. |
| 2006/0200434 A1 | 9/2006 | Flinn et al. |
| 2007/0060109 A1 | 3/2007 | Ramer et al. |
| 2007/0203790 A1 | 8/2007 | Torrens et al. |
| 2007/0277093 A1 | 11/2007 | Joshi et al. |
| 2008/0005075 A1 | 1/2008 | Horvitz et al. |
| 2008/0005103 A1 | 1/2008 | Ratcliffe et al. |
| 2008/0046555 A1 | 2/2008 | Datta et al. |
| 2008/0077461 A1 | 3/2008 | Glick |
| 2008/0077574 A1 | 3/2008 | Gross |
| 2008/0104004 A1 | 5/2008 | Brave et al. |
| 2008/0104030 A1 | 5/2008 | Choi et al. |
| 2008/0215623 A1 | 9/2008 | Ramer et al. |
| 2008/0243827 A1 * | 10/2008 | Sarma ............... G06F 17/30528 |
| 2008/0288494 A1 | 11/2008 | Brogger et al. |
| 2008/0294607 A1 | 11/2008 | Partovi et al. |
| 2009/0018851 A1 | 1/2009 | Greenfield |
| 2009/0031030 A1 | 1/2009 | Schmidt |
| 2009/0089751 A1 * | 4/2009 | Raikes ............... G06F 9/4446 717/120 |
| 2009/0100047 A1 | 4/2009 | Jones et al. |
| 2009/0299812 A1 | 12/2009 | Ray |
| 2010/0105315 A1 | 4/2010 | Albrett |
| 2010/0169148 A1 | 7/2010 | Oberhofer et al. |
| 2010/0205541 A1 | 8/2010 | Rapaport et al. |
| 2010/0250341 A1 | 9/2010 | Hauser |
| 2010/0287033 A1 | 11/2010 | Mathur |
| 2011/0113094 A1 | 5/2011 | Chunilal |
| 2011/0162038 A1 | 6/2011 | Chunilal |
| 2011/0184960 A1 | 7/2011 | Delpha et al. |
| 2011/0191311 A1 | 8/2011 | Polonsky et al. |
| 2011/0231488 A1 | 9/2011 | Xu |
| 2011/0307478 A1 | 12/2011 | Pinckney et al. |
| 2012/0030553 A1 | 2/2012 | Delpha et al. |
| 2012/0036523 A1 | 2/2012 | Weintraub et al. |
| 2012/0143911 A1 | 6/2012 | Liebald et al. |
| 2012/0197813 A1 | 8/2012 | Kurtzig et al. |
| 2012/0311139 A1 | 12/2012 | Brave et al. |
| 2012/0316940 A1 | 12/2012 | Moshfeghi |
| 2012/0331052 A1 | 12/2012 | Rathod |
| 2013/0073473 A1 * | 3/2013 | Heath ............... G06Q 30/02 705/319 |
| 2013/0073568 A1 | 3/2013 | Federov et al. |
| 2013/0096937 A1 | 4/2013 | Campbell et al. |
| 2013/0097246 A1 * | 4/2013 | Zifroni ............... G06Q 50/01 709/204 |
| 2013/0124449 A1 | 5/2013 | Pinckney et al. |
| 2013/0159325 A1 | 6/2013 | Polonsky et al. |
| 2013/0166346 A1 | 6/2013 | Al-Zuhair et al. |
| 2014/0006372 A1 | 1/2014 | Ickman et al. |
| 2014/0038725 A1 | 2/2014 | Mizrahi et al. |
| 2014/0108395 A1 | 4/2014 | Polonsky et al. |
| 2014/0257890 A1 | 9/2014 | Polonsky et al. |
| 2015/0046435 A1 * | 2/2015 | Donneau-Golencer G06F 17/3053 707/722 |

* cited by examiner

IMPLICIT PROFILE FOR USE WITH RECOMMENDATION ENGINE AND/OR QUESTION ROUTER

CROSS REFERENCE

This application is a continuation-in-part of commonly owned, U.S. patent application Ser. No. 13/532,936 filed on Jun. 26, 2012, which is a continuation-in-part of U.S. patent application Ser. No. 12/592,799 filed on Dec. 2, 2009 (now U.S. Pat. No. 8,244,674), and claims the benefit of U.S. Provisional Patent Application No. 61/601,085 filed on Feb. 21, 2012, each of which is incorporated herein by reference in their entirety and for all purposes.

BACKGROUND OF THE INVENTION

The present invention relates to an implicit profile for use with a recommendation engine or a question router. The recommendation engine and question router are part of a peer directory which provides for the online location of peers that can be considered experts in a particular business or endeavor. Once qualified peers are located, connections to such peers can be requested for project, product and implementation advice and information, and the like. The implicit profile of the present invention is an extension of the profiles disclosed for use in the question router and the peer directory disclosed in the above-identified parent applications and enables an increase in the question and answer rates in a peer forum system. The question router accomplishes this result by automatically sending the questions to the most appropriate subject matter experts in the peer directory through matching of question key words with key words from the implicit and explicit user profiles.

Various tools for arranging business introductions are known in the art. For example, J. Greenfield U.S. Patent Publication No. 2009/0018851 discloses a network that uses registration information of multiple parties along with a matching function to match two parties that have a business contact that both parties would benefit from if the parties were introduced. Procedures are provided to notify the parties of a potential match, and to facilitate communication between the parties if the introduction is accepted by the parties.

U.S. Pat. No. 7,454,433 to Ebert discloses a system for providing adaptive virtual communities. By determining a technical or business context of a particular user, the system is able to match that user with other users who are likely to be able to assist the user within that context.

U.S. Pat. No. 7,035,838 to Nelson et al. discloses methods and systems for organizing information stored within a computer network-based system. Documentation relating to a plurality of topics and a list of experts on a plurality of topics is stored in a centralized database. A user interface enables a user to search the database for a specific item of information by at least one of a work function, a functional category and a community.

Prior art systems, such as those referenced above, generally provide too many potential matches between a requester and available contacts. The requester will then have to sort through these many potential matches to attempt to find a match that will be most relevant. Such systems can waste the requester's time and may not result in the best match being found, since the requester may settle for a less relevant match instead of carefully considering each of the many potential matches presented. Moreover, once a match is selected by a requester, the individual associated with that match may not respond to a request by the requester to communicate. This can waste more time, as the requester may wait several days to hear back from the match, only to find that no response is ever received. The requester will then have to find another match, with no assurance that the individual associated with the new match will be likely to respond to a request to communicate.

The present invention addresses the lack of a healthy question and answer rate in a web based community forum. A good question and answer ("Q&A") rate is necessary to keep the community dynamic and healthy. Typically community managers play a big role in keeping the community dynamic by answering questions or facilitating the answering of questions. This can be a very manual and time intensive process. It would be advantageous to increase the question and answer rates in a community forum in an automated fashion, thereby cutting down the amount of manual intervention.

In an improved system contemplated by the present invention, clients (peers) consist of a highly respected set of experts in their areas. Peers are encouraged to post their questions/thoughts on the community Q&A forums. A system in accordance with the present invention can then be used to help increase the engagement of community members in the forums and get their questions answered.

It would be advantageous to provide improved apparatus and methods for routing questions posted by peers to other peers in the community that can best assist a user in solving a business or technical problem. It would be further advantageous if such apparatus and methods would provide more relevant matches to the requester, to increase the likelihood that a helpful peer will respond to the questions quickly and efficiently. It would be still further advantageous if potential matches presented to the requester comprise peers that are more likely than not to respond to a request to communicate with the requester. In particular, it would be advantageous to increase the question and answer rates in a community forum in an automated fashion, thereby cutting down the amount of manual intervention.

The present invention provides an implicit profile for use with a recommendation engine or a question router that provides the aforementioned and other advantages.

SUMMARY

In accordance with the invention, a peer directory system is provided. The system is implemented on a digital computer network. A user interface enables explicit profile information of a user to be entered and stored in a profiles database. A search engine is adapted to append tags to the explicit profile information. The search engine can comprise, for example, a computer processor and software to implement a search function. A search index is associated with the search engine for storing tagged user profile information in an indexed form. A peer relevancy algorithm is associated with the search engine to search for candidate peers among the indexed user profile information stored in the search index. The peer relevancy algorithm assigns weights to candidate peers based on different categories of the indexed user profile information, and selects peer matches based on the assigned weights.

In an illustrated embodiment, a first weight is assigned to candidate peers who have a best initiative match with a user searching for peers. The "initiative" can be, for example, a project or venture that the user is currently working on for an enterprise such as an employer. A second weight is assigned to candidate peers who have a best vendor/product match with the user searching for peers. A third weight is assigned to candidate peers who have a best primary operating system (OS) match (e.g., Windows, Mac OS X, SunOS, Linux, Unix, etc.) with the user searching for peers. A fourth weight is assigned to candidate peers who have a best industry match with the user searching for peers. A fifth weight is assigned to candidate peers who have a best firm size match (e.g., size of employer by number of employees, sales revenue, etc.) with the user searching for peers.

The first, second, third, fourth and fifth weights can be summed across all tags for the candidate peers in order to provide a composite weight for each candidate peer. The candidate peers can then be sorted by their composite weights.

In a preferred embodiment of the invention, the search index stores information indicative of past connection responses for candidate peers. Based on this information, the peer relevancy algorithm provides either (a) a negative bias to candidate peers that have poor past connection responses, or (b) a positive bias to candidate peers that have good past connection responses.

The user interface may comprise a display processor for providing display information indicative of best matched peers and allowing information about the best matched peers to be viewed and filtered by a user searching for peers. The user interface may also comprise any suitable type of data entry means such as a keyboard, mouse, touch screen, or the like.

The peer relevancy algorithm can be implemented such that it is responsive to a request entered via the user interface to select a peer match for a requester. In such an embodiment, the algorithm will return peer matches to the requester via the user interface. The user interface can be implemented to enable the requester to request connection to one or more peers identified by the peer matches. A communications processor, responsive to a peer connection requested by the requester, may be provided for (i) generating a connection request message to the applicable peer, (ii) receiving a reply from said applicable peer, (iii) if the applicable peer accepts the connection, sending a connection acceptance to the requester with contact information for the applicable peer, and (iv) if the applicable peer fails to accept the connection, sending a connection rejection to said requester.

In a preferred embodiment, the connection request message discloses at least one of the requester's company, industry, role or a personal message from the requester without disclosing the identity of the requester. Contact information for the requester is disclosed to the applicable peer only if the connection is accepted.

Various additional features of the invention include the ability of the user interface to allow a user to filter peer matches by at least one of industry, firm size, country, job role, vendor and product/service category. The weights assigned to the various candidate peers based on different categories of the indexed user profile information can be configurable to allow, e.g., for the tuning of the weights due to present or future circumstances. The negative and positive biases provided to candidate peers based on their past connection response history can also be configurable, e.g., to increase or decrease the significance of the bias in choosing peer matches for presentation (e.g., display) to a requester.

A method is also disclosed for connecting peers having common interests. The method enables explicit profile information to be collected from a user. Tags are appended to the explicit profile information. Tagged user profile information is stored in a profiles database in an indexed form. The profiles database is searched to identify candidate peers in response to a request for a peer match. The identification of candidate peers is based on correlations between a requester's user profile information and user profile information for the candidate peers. Weights are assigned to the candidate peers, and peer matches are selected based on the assigned weights.

In an illustrated embodiment, the weights assigned to candidate peers are based on at least one of best initiative match, best vendor match, best product match, best primary operating system (OS) match, best industry match and best firm size match. The weights assigned to candidate peers are summed for each such peer. The candidate peers are sorted by their composite weights.

Information indicative of past connection responses for candidate peers can be maintained. Based on this information, a negative bias can be provided to candidate peers that have poor past connection responses, and a positive bias can be provided to candidate peers that have good past connection responses.

In a further embodiment of the invention, individual clients have access to online peer forum systems. The system is implemented on a digital computer network and includes a user interface operatively associated with a digital computer for enabling questions to be input via the digital computer network. Access to such peer forum systems is generally restricted to a highly qualified set of individuals. Users have to register, provide explicit profile information and login to access the forums. Users can ask questions on the forum and get relevant answers from their peers. A question router, which operates via a question router algorithm, is associated with the computer network to enable higher answer rates for questions posed by users. The question router algorithm is completely automated and routes input questions to the most relevant peers, thereby increasing the answer rates with no manual intervention. This also helps indirectly to increase the question rates since peers find their questions answered and thereby feel confident about posing more questions.

A forums database is associated with the question router and captures all the questions and answers input by clients. At any given point in time, questions or answers can be looked up in this database. A second database pulls all open questions from the forums database into its own storage. Open questions are questions for which no reply has been made or no answer has been given. The system can also be designed to pull all questions and replies on a periodic basis. A peer search module pulls the open questions from the second database to find peers who can answer the questions. The peer search module consists of a recommendation engine and peer profile database modules.

The recommendation engine is able to find peers (e.g., experts) qualified to answer the questions. This is done using a combination of collaborative and cluster filtering algorithms. The recommendation engine may take into consideration both explicit and implicit profiles of a peer to figure out the peer's subject matter expertise. If the peer's subject matter expertise is the same as the open question, then he becomes a candidate to answer the open question. The peer's subject matter profile is further strengthened by his propensity to answer questions on the peer forum system and his expertise as demonstrated in the peer forum systems.

The peer profile database module acts as input to the recommendation engine so that the qualified peer matches can be found. This database stores the user's explicit and implicit profile. The explicit profile comprises information that generally defines the user based on the user's direct input into the system. This is usually derived from registration forms where the user has input his industry experience, job titles and duty descriptions, size of company, company name, projects he is working on, vendors he is working with, etc. The implicit profile of a user is based on the user's tracked behavior on one or more electronic devices and/or on the web site used to access the inventive system. The implicit profile is described in detail below.

After receiving open questions into the peer search module and receiving the peer recommendations from the recommendation engine, "throttle" rules are used to determine if each peer in a candidate set of peers can be sent an email or other type of electronic message encouraging them to answer the open questions. There might be rules that limit the number of messages that can be sent to a candidate, such as "only send three emails per person per week." The peers who can get past the throttle rules become eligible to be sent messages, requesting them to answer the questions. For example, an email delivery system may send emails to the peers requesting them to answer the open questions. The email delivery system consists of email templates and email sending systems. A touch database captures all the sent emails. This data can be used in the future to figure out the number of emails sent to users and to adjust and/or derive email throttling rules.

Peer experts open the emails received from the email delivery system and find questions they can answer. The email will contain, for example, links which will take the peer experts to the open question where they can comment on or answer the question.

In a further example embodiment of the present invention, a method for creating an implicit profile for use by a recommendation engine or a question router is provided. An example embodiment of an automated method for creating an implicit profile for use by at least one of a recommendation engine or a question router comprises tracking user behavior on at least one of one or more electronic devices and an electronic communications network, analyzing user-related information relating to the user behavior to extract or derive key words therefrom which are used to characterize user interests, expertise, and skills, and storing the key words in a profiles database as the implicit profile. The key words are used by the recommendation engine or question router when matching a request from a querying user to a potential user or group of users having the relevant background to respond to the request.

The user-related information may comprise at least one of search terms used, documents read, documents opened, documents printed, documents saved, documents created, documents edited, documents commented on, annotations entered on documents, highlighted terms in documents, websites visited, webpages viewed, Internet searches conducted, ratings provided by the user on documents, products or services, user-created product or service reviews, multi-media items played, social forum threads opened, social forum threads participated in, people profiles opened, user items shared on the electronic communications network, shared items of others on the electronic communications network accessed by the user, user created content, online events, seminars, training courses, or webinars attended, in-person or online events, seminars, or training courses registered for, news or information feeds set up on the electronic communications network, emails written, emails received, blogs read, blog posts entered, software applications installed, computer hardware installed, software updates downloaded, one or more of alerts, follows, and likes set up on the electronic communications network, and similar information.

In addition, the user-related information may be obtained from user activity on a web site used to access the recommendation engine or the question router. For example, the user-related information may comprise at least one of questions answered, answers provided, information and materials reviewed in answering questions, number of questions answered in a subject area, percentage of questions accepted for response, subject matter expertise based on answers submitted, number of times recommended as an expert in a subject area, user frequency of logging in to the web site, user preference for type of digital network, user preference for type of electronic device, user preferred information channels including one or more of reading or printing of documents, use of multimedia, and interacting socially in forums, user open and click-through rates for relevant emails, and similar information.

In addition, the user-related information may comprise at least one of user requests or user responses via the web site used to access the recommendation engine or the question router.

Optionally, the user-related information may also comprise user requests submitted to the recommendation engine or the question router via online forms, emails, or computer applications that are recorded in a request database to find at least one of experts, analysts, or peers, or to receive requested information or materials.

Further, the user-related information may comprise user requests submitted to the recommendation engine or the question router or other linked web-based tools via online forms, emails, or computer applications that are recorded in a request database for at least one of vendor proposals, product demonstrations, price quotes, and the like.

The user-related information may be obtained from electronic imprints from user interaction with the one or more electronic devices that are logged in a database. The one or more electronic devices may comprise at least one of a computer, a tablet computer, a laptop, a smartphone, an Internet enabled device, and the like.

The electronic imprints may be created by at least one of using a web interface, using a web browser, using a mobile application, using a computer application or program, sending or receiving an email, logging or recording a telephone call or voice message, manipulation of a self-reporting electronic system, downloading or installing one or more of programs, applications, documents, multimedia content, music, and software updates, and the like.

In one example embodiment, weightings may be assigned and stored with each of the key words in the profiles database. The weightings may be assigned based on one or more of relevancy calculations of the user-related information, an estimate of accuracy of the user-related information, type of the user-related information, source of the user-related information, amount of each type of the user-related information, time spent by user on each type or item of user-related information, recency of the user-related information, relation of the user-related information to current key words in the implicit profile, relation of the user-related information to information in an explicit profile of the user, and the like.

The tracking may comprise at least one of storing data from the user behavior at the time of the user behavior, searching the one or more electronic devices for data relating to the user behavior, recording user interaction on the one or more electronic devices, and the like.

The tracking may be enabled via a crawling or searching application running on the one or more electronic devices for searching various computer applications or storage locations on the one or more electronics device for obtaining the user-related information.

The various computer applications may comprise one or more of a word processing application, a web browser, an electronic calendar, an email program, spreadsheet applications, social media applications, messaging applications, content editing, highlighting, and annotating programs, and the like.

The storage locations may comprise at least one of hard drive locations, file folders, document folders, web browser cookie folders, email folders, databases, spreadsheet folders, shared folders, networked folders, music folders, software application folders, media files, file directories, social directories, activity logs, and the like.

The key words may be extracted or derived from the user-related information by applying at least one of lexical analysis, metadata analysis, natural language processing analysis, or similar processing techniques or combinations thereof.

The method may further comprise storing an explicit profile for the user in the profiles database together with the implicit profile for use by at least one of the recommendation engine and the question router. The explicit profile may comprise profile data obtained by direct input from the user.

A plurality of the implicit and explicit profiles may be stored for each of a corresponding plurality of respective users in the profiles database. The implicit profile of the user may be matched with the explicit profile of the user for use in processing recommendation requests or information requests.

In addition, the key words, values, key word weightings, and other information stored in the matching explicit and implicit profiles of the user may be merged to create a merged profile for use by at least one of the recommendation engine and the question router.

The question router may be adapted to automatically route a question from a querying user to one or more of the other users on the electronic communications network based on a matching of key words obtained from the question with at least the implicit profiles of the one or more other users.

The recommendation engine may be adapted to accept a recommendation request for an expert from a querying user and recommending one or more of the other users on the electronic communications network as an expert based on a matching of key words obtained from the recommendation request with at least the implicit profiles of the one or more other users.

The method may also comprise providing user feedback on relevancy of at least one of a recommendation request from the recommendation engine, a response to the recommendation request from a recommended peer, a question from the question router, and a response to the question from the recommended peer to the user's expertise, and storing of the feedback. The user's feedback on relevancy may be used to adjust key word weightings in the implicit profile of the user and/or the recommended peer.

A system for creating an implicit profile for use by at least one of a recommendation engine or a question router is also provided in accordance with the present invention. An example embodiment of such a system may comprise an electronic communications network and one or more electronic devices for each user in communication with the electronic communications network. A software application running on each of the electronic devices is adapted for tracking user behavior on at least one of the one or more electronic devices and the electronic communications network. One or more information databases is provided for storing user-related information relating to the user behavior. The system may also include an analyzer associated with the one or more databases and at least one of the recommendation engine or the question router for receiving and analyzing the user-related information relating to the user behavior and extracting or deriving key words therefrom for use in characterizing user interests, expertise, and skills. In addition, a profiles database is provided which is associated with at least one of the recommendation engine or the question router for storing the key words as the implicit profile.

The system also includes the additional features of the corresponding methods set forth above.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

In order to use the peer directory of the present invention, a user opts-in to the directory service via a user interface. The directory can reside on a server which is accessible via a network. Once the user is connected to the server, an explicit user profile can be created, accessed and/or updated. The explicit profile includes, for example, information relating to the product and/or vendor expertise of the user.

Once an explicit profile is complete, a user can then use the inventive system to search the peer directory for peers with relevant knowledge. Once suitable peers are found, a peer connection algorithm is used to initiate a connection to an identified peer through a network, such as via email or the like. The connection may be made in an anonymous manner, through an intermediary. Bilateral consent to connect may be required, via the intermediary, prior to establishing communication between the user and the relevant peer(s).

Figure 1:
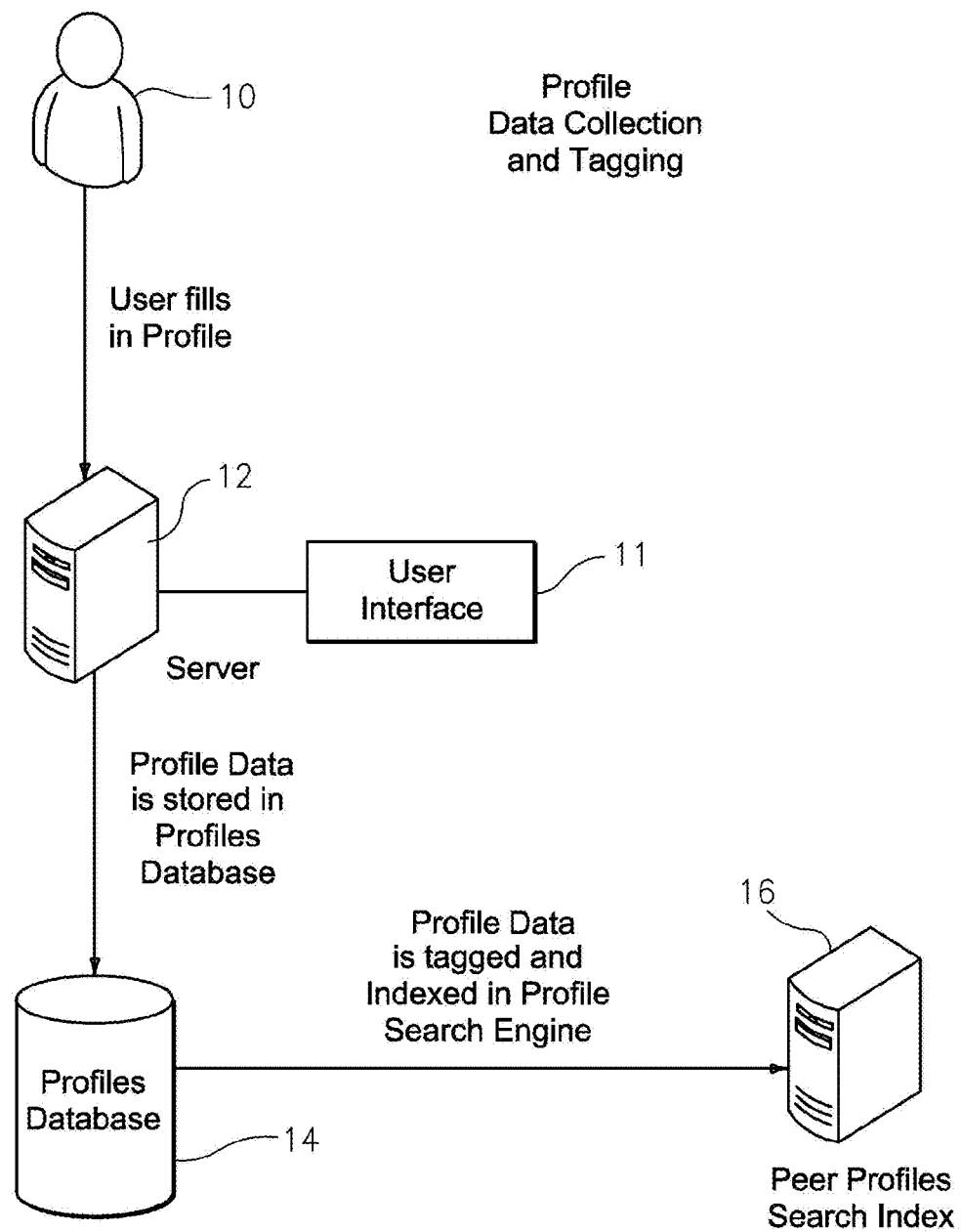
FIG. 1 is a block diagram of components of an example embodiment of the present invention relating to the collection and tagging of user profile data.

FIG. 1 illustrates, in block diagram form, the main components of the inventive system that handle the collection and tagging of profile data. A user 10 fills in a profile template using a user interface 11. The user interface can comprise, for example, a graphic user interface (GUI) of a type well known in the art. A computer processor residing in a server 12 ("digital computer") generates the template for the user to complete. The template can request, for example, demographic information, information about the user's employer and industry ("firmographic" data), information about the user's education, expertise, professional interests and the like ("about me" data), information identifying what the user is working on at his or her job, information about products and services of interest to the user, and other categories of information.

The user's responses to the template are used to create an explicit profile for the user. The explicit profile for the user is stored, together with the explicit profiles of other system users, in a profiles database 14, which can be maintained in a memory associated with the server 12. A search engine (e.g., hardware, firmware, and/or software) resident in server 16 maps the profile data for the user with metadata tags useful for searching the data. The tagged data is then stored in a peer profiles search index 16. The search index 16 can be implemented in another server or computer accessible to the server 12.

Figure 2:
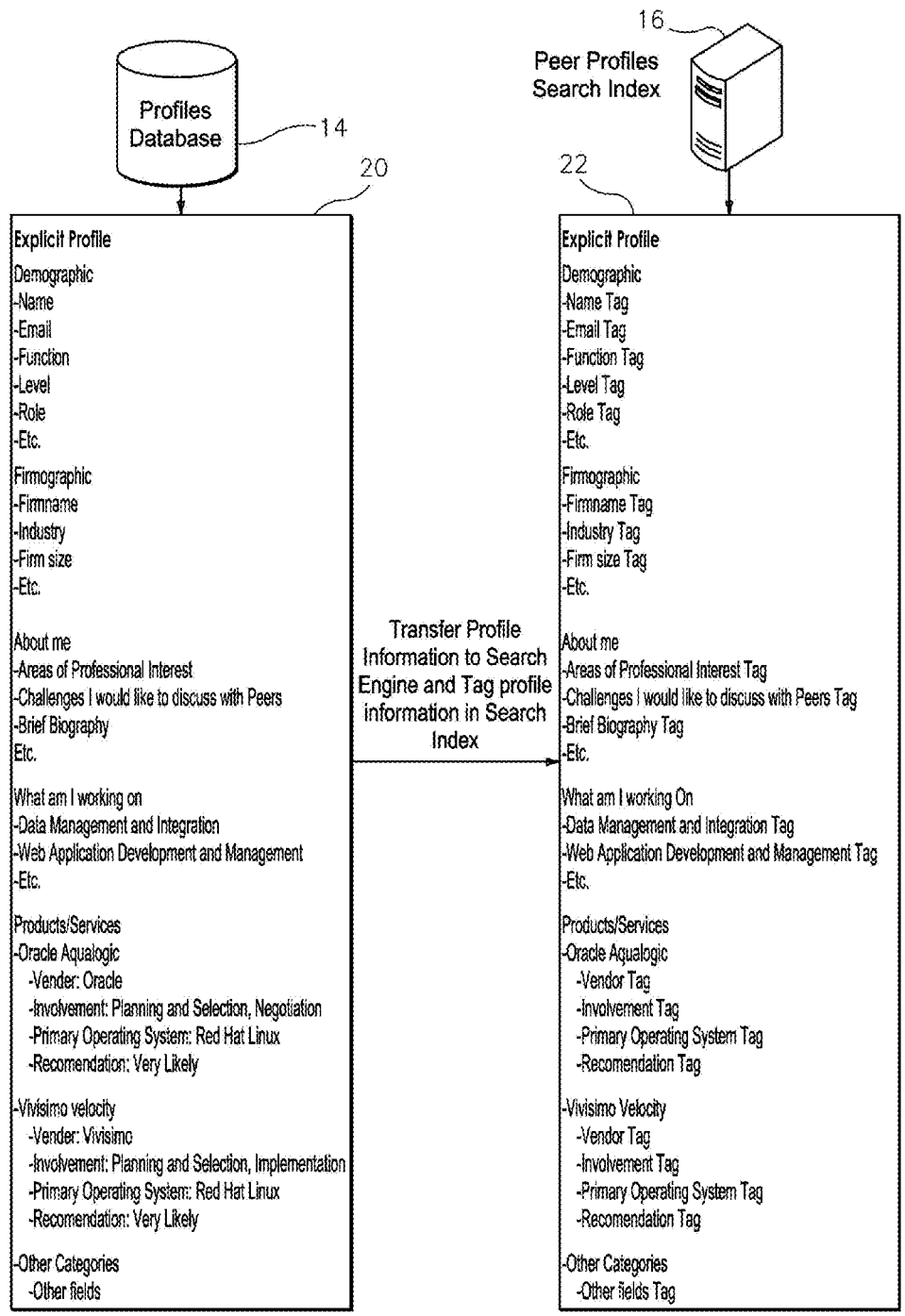
FIG. 2 is a block diagram illustrating example fields of an explicit user profile and example tags relating thereto in accordance with the present invention.

FIG. 2 illustrates examples of the data that can be requested by the template for creating the explicit profiles, as well as the tags that are provided for this data and stored in the peer profiles search index. As noted above, after entry via the user interface in response to the template, the user data ("explicit profile") is stored together with the profiles of other system users in the profiles database 14. The stored data 20 includes, for example, demographic information for the user, including name, email address, job function, job level, role being served at job, and potentially other job related information. Also included in the stored data 20 is "firmographic" information relating to the user's employer, such as the firm name, industry, firm size, and the like. Another category of information included in the data 20 is "about me" information, including, for example, the user's areas of professional interest, challenges that the user would like to discuss with peers, a brief biography of the user, and similar data. A "what am I working on" category can include items such as the user's data management and integration projects, web application development and management responsibilities, and the like.

Another category of information that can be maintained for a user in the profiles database relates to products and services of interest to that user. For example, a user may be responsible for specifying, procuring and/or maintaining a business process management (BPM) suite and/or an enterprise search platform provided by a specific vendor, such as the Oracle Aqualogic suite or the Vivisimo Velocity search platform. This can be identified in the user's profile, together with pertinent information such as the vendor name, the user's involvement with the product, the primary operating system on which the suite is run and the user's recommendation for the product. Other categories of information can also be provided in the user's profile that will be useful in the search for a peer to assist the user in completing an assigned project.

The information in each explicit profile maintained in the profiles database 14 is transferred to a search engine (e.g., resident in server 16) that appends tag profile information to the explicit profile data. The tagged data 22 is then stored in the peer profiles search index 16. In this manner, the search engine can search the tags stored in the peer profiles search index rather than searching all of the explicit profile information itself in the profiles database. This design allows for much more efficient searching, higher relevancy and a quicker response when a requester queries the system for peer matches.

Figure 9:
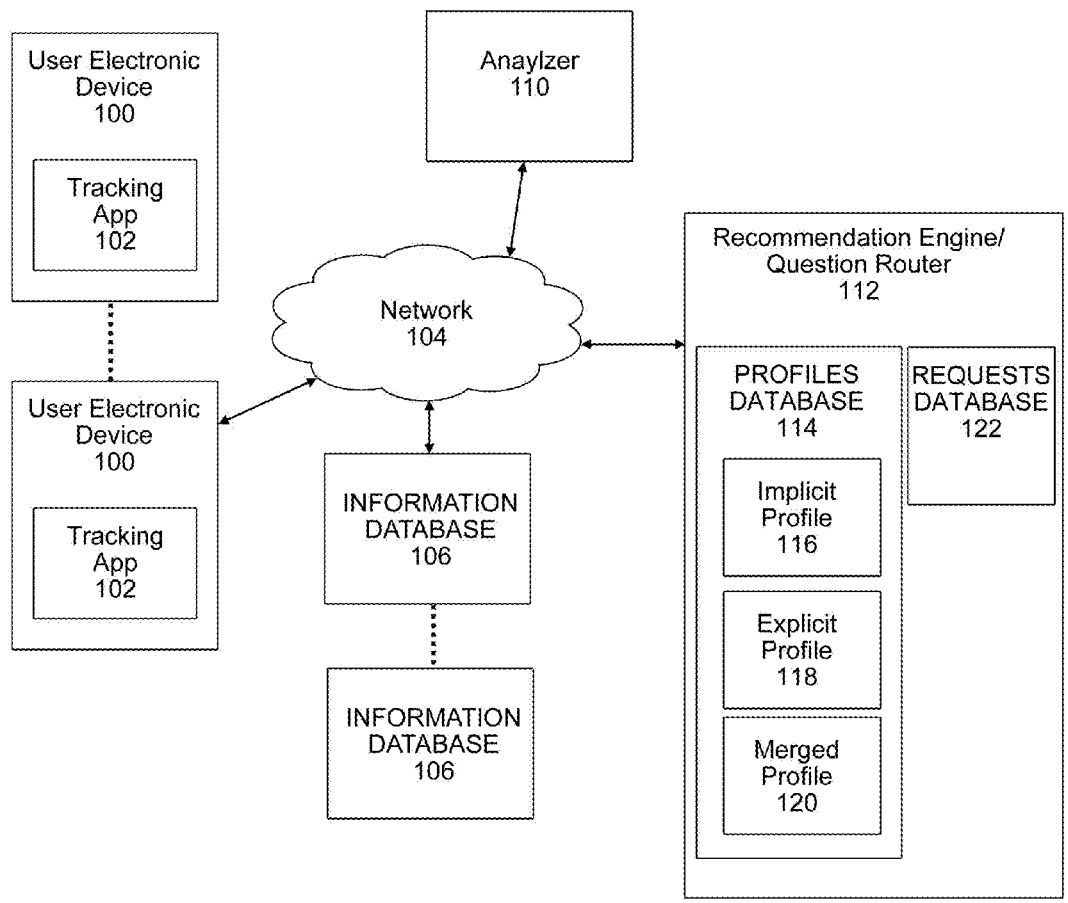
FIG. 9 is a block diagram of an example embodiment of a system for creating an implicit profile in accordance with the present invention.

The profiles database 14 may also store implicit profiles for each user which are created based on an analysis of the user's behavior on the system or electronic devices used to access the system, as discussed in detail below in connection with FIGS. 9 and 10. The data in the implicit profile, once entered in the peer profiles search index 16, may be treated in the same manner as the explicit profile data discussed above (for example, be stored with corresponding tag data) or as discussed further below.

Figure 3:
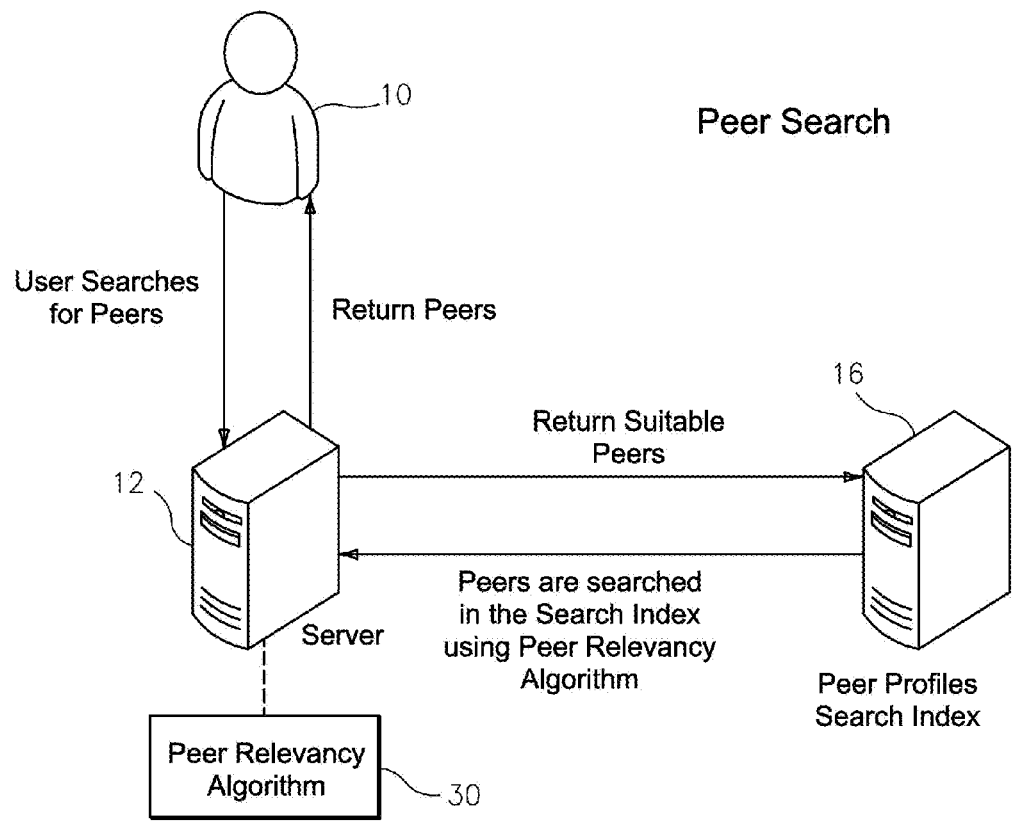
FIG. 3 is a block diagram of components of an example embodiment of the present invention relating to the search for peers.

FIG. 3 is a block diagram that illustrates a preferred embodiment of the peer search system. A user ("requester") 10 uses the user interface 11 (FIG. 1) to search for peers via the application implemented in server 12 which in turn connects with the search engine in server 16. The search engine can comprise software and/or hardware resident in the server 16. A peer relevancy algorithm 30 is a key component of the search engine, and is described in greater detail in the flowchart of FIG. 4.

When a user requests to be matched with potential peers via the user interface, the search engine searches the peer profiles search index 16 using the peer relevancy algorithm. Matches are located by the peer relevancy algorithm based on the tags stored in the peer profiles search index and their values, and a list of suitable peers is returned to the application at server 12. Server 12 then passes the matched peers to the user 10 via the user interface. In a preferred embodiment, the peer matches are displayed to the user via a computer display. The user interface allows the user to view each of the peer matches and to drill down for further information relating to each peer match. After reviewing the peer matches in this manner, the user can decide which match(es) would potentially be most helpful, and commence a procedure for contacting each such match.

Figure 4:
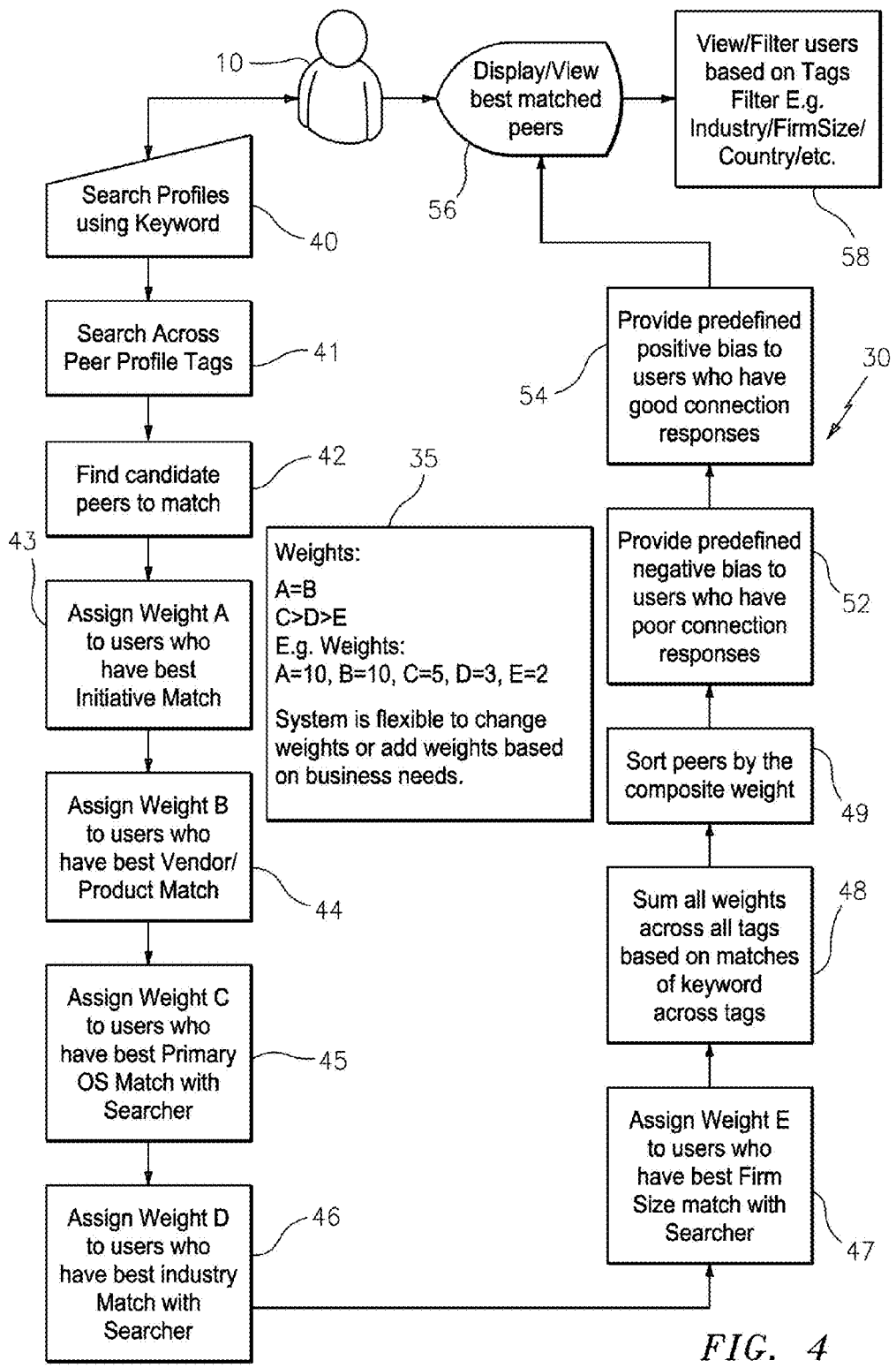
FIG. 4 is a flowchart of an example embodiment of the peer relevancy algorithm in accordance with the present invention.

The flowchart of FIG. 4 provides details on the matching and sorting of suitable peers on the search engine using tags and their values. The user 10 can commence a search for peers having profiles within the peer profiles search index in server 16 using keywords, as indicated at box 40. The keywords entered are used by the search engine to search across peer profile tags stored in the peer profiles search index 16, as indicated at box 41. The search engine finds candidate peers that match the search criteria (box 42) and begins assigning weights to the different candidate peers based on which ones have the best matches to the requester's needs in different categories. In particular, at box 43, a first weight "A" is assigned to candidate peers that have a best initiative match with the requester. The "initiative" can be, for example, a project or venture that the user is currently working on for an enterprise such as an employer.

At box 44, a second weight "B" is assigned to candidate peers who have a best vendor/product match with the requester. At box 45, third weight "C" is assigned to candidate peers who have a best primary operating system (OS) match (e.g., Windows, Mac OS X, SunOS, Linux, Unix, etc.) with the requester. A fourth weight "D" is assigned to candidate peers who have a best industry match with the requester, as indicated at box 46. At box 47, a fifth weight "E" is assigned to candidate peers who have a best firm size match (e.g., size of employer by number of employees, sales revenue, etc.) with the requester. Once all of the weights are assigned, they are summed across all tags based on matches of the keyword across the tags (box 48).

It should be appreciated that the categories of information to which weights are assigned at boxes 43-47 are not the only categories for which such weights can be assigned. Different categories of information can be added to or substituted for those shown, as will be apparent to those skilled in the art. Moreover, the system is flexible to change and/or add weights based on the needs of the business using the peer search system of the invention. In the illustrated embodiment, as shown at box 35 of FIG. 4, weight A=B, and weight C>D>E. For example, numerical weights can be assigned as follows: A=10, B=10, C=5, D=3, and E=2. As these are just examples, the weights actually assigned in a particular system may be different. Moreover, the system can be configurable to assign different weights to different categories as needed.

As an example of the weighting process, assume that a peer has the following explicit profile:
  Initiative: Application Architecture
  Current Status: Active
  Description: PANAMA—fully redundant, zero downtime architecture.
  Initiative: Data Management & Integration
  Vendor Name: SampleX Corporation
  Current Status: New
  Description: Integration of CorporationA and CorporationB.com site
  Initiative: Web Application Development & Management|Edit|Remove
  Vendor Name: ExampleZ, Inc
  Current Status: Fully Implemented
  Description: Implemented the CorporationB Search feature using ExampleZ Search Engine.
  Product: SampleX Liquidlogic
  Vendor Name: SampleX Corporation
  Product/Service Category: Application Integration and Middleware Software
  Your Involvement: Planning and Selection, Negotiation, Implementation,
  Maintenance/Support
  Primary Operating System: Red Hat Linux (Server)
  Recommendation: Very Likely
  Product: Windspeed
  Vendor Name: ExampleZ, Inc
  Product/Service Category: Search and Information Access
  Your Involvement: Planning and Selection, Negotiation, Implementation, Maintenance/Support
  Primary Operating System: Red Hat Linux (Server)
  Recommendation: Confidential
  Comments: Full Life Cycle Implementation with Corporation B.com application When a user types in a keyword to search for peers the system will try to match on the Initiative, Vendor Name, Description, Primary Operating System, Product/Service Category, Product fields (a/k/a tags), Comments, etc. across all peers. Depending on where the match occurs a different weight might be given. For example, if a user types in the keyword "Application" matches will result on:
  Initiative: Application Architecture—assign a weight of 10
  Initiative: Web Application Development and Management, assign a weight of 10
  Product/Service Category: Application Integration and Middleware Software, assign a weight of 5
  Comments: Full Life Cycle Implementation with CorporationB.com application, assign a weight of 1

All the weights are then summed to provide a unique score for each peer.

Once the weighting process is complete, each candidate peer will have a particular composite weight (the peer's "score"), and the peers are then sorted based on the composite weights as indicated at box 49. The sorted list of peers can then be presented to the requester. However, before presenting the list of peers to the requester, another series of steps can be provided to further increase the likelihood that a suitable match will be found.

Specifically, some users who have a good past connection history with peers may be more inclined to respond to a match request than others. The system can therefore keep track of the past history of users in responding to requests to connect to another user using the system. With this information, the system can provide a pre-defined negative bias to users that have poor connection responses, as indicated at box 52, and provide a pre-defined positive bias to users who have good past connection responses, as indicated at box 54. The bias can be implemented by simply increasing the weight assigned to good past responders and by decreasing the weight assigned to poor past responders. Such a bias can be added to or subtracted from the current weight for a given peer based on a fixed "bias" value or a percentage modification of the current weighting for each peer match. The bias for each peer match can then be presented to the requester using a flag or other indicia when the match is presented to the requester (e.g., via a computer display associated with the user interface) or by re-sorting the list of peer matches to account for the modified weight resulting from the bias. Alternatively, the sorting step 49 can be done subsequent to the bias steps 52 and 54, instead of prior to step 52 as shown in FIG. 4.

After the list of peer matches has been sorted, it is presented to the requester 10 using, e.g., a computer display or the like, as indicated at box 56. The requester can also use the user interface to view and/or filter proposed matches based on the tags as indicated at box 58. Such filtering can be done, for example, with respect to the requester's (and/or the peers') industry, firm size, country, job role, vendor, product service/category, etc. The requester can also filter for peers in his own company if he so chooses.

Figure 5:
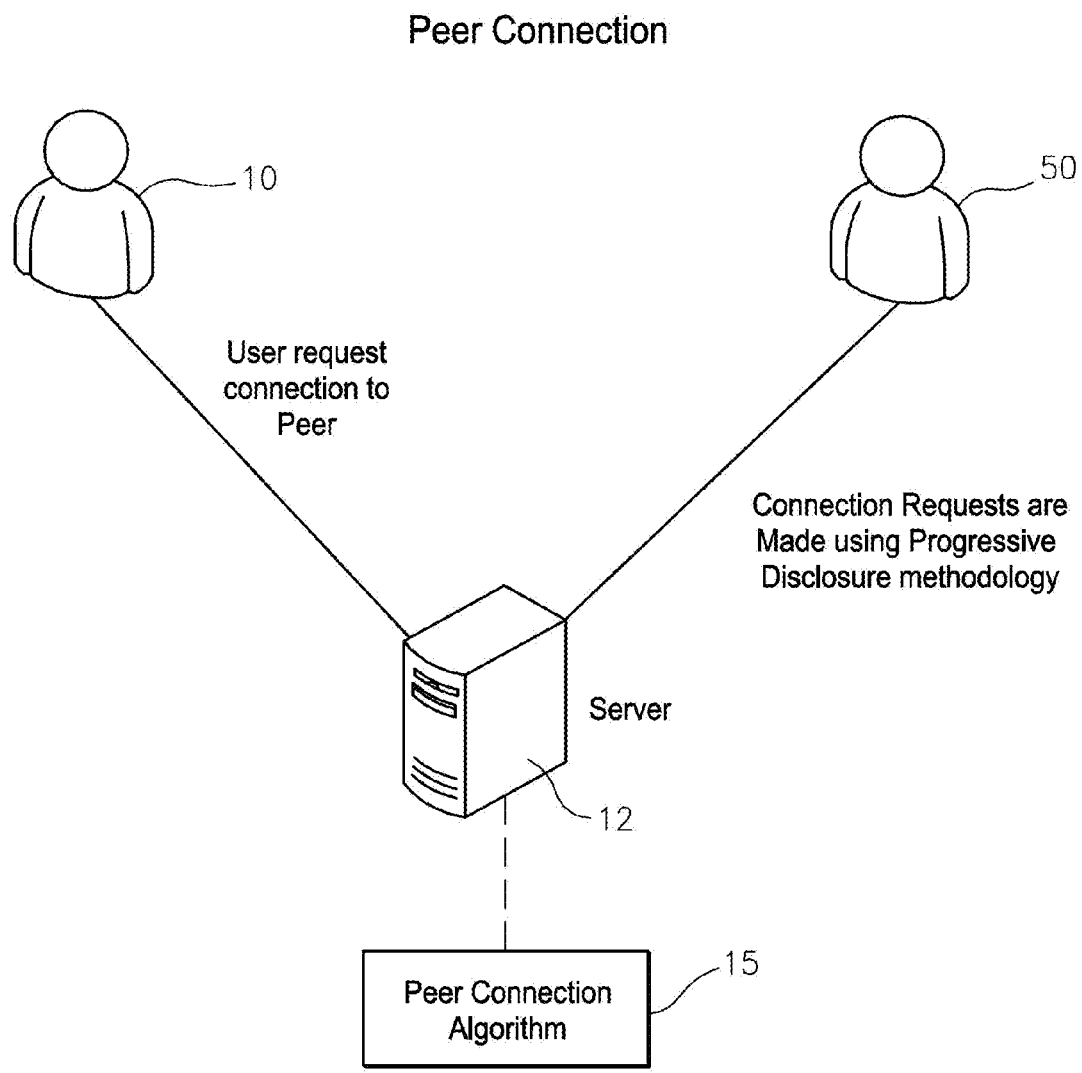
FIG. 5 is a block diagram of components of an example embodiment of the present invention relating to the peer connection algorithm.
Figure 6:
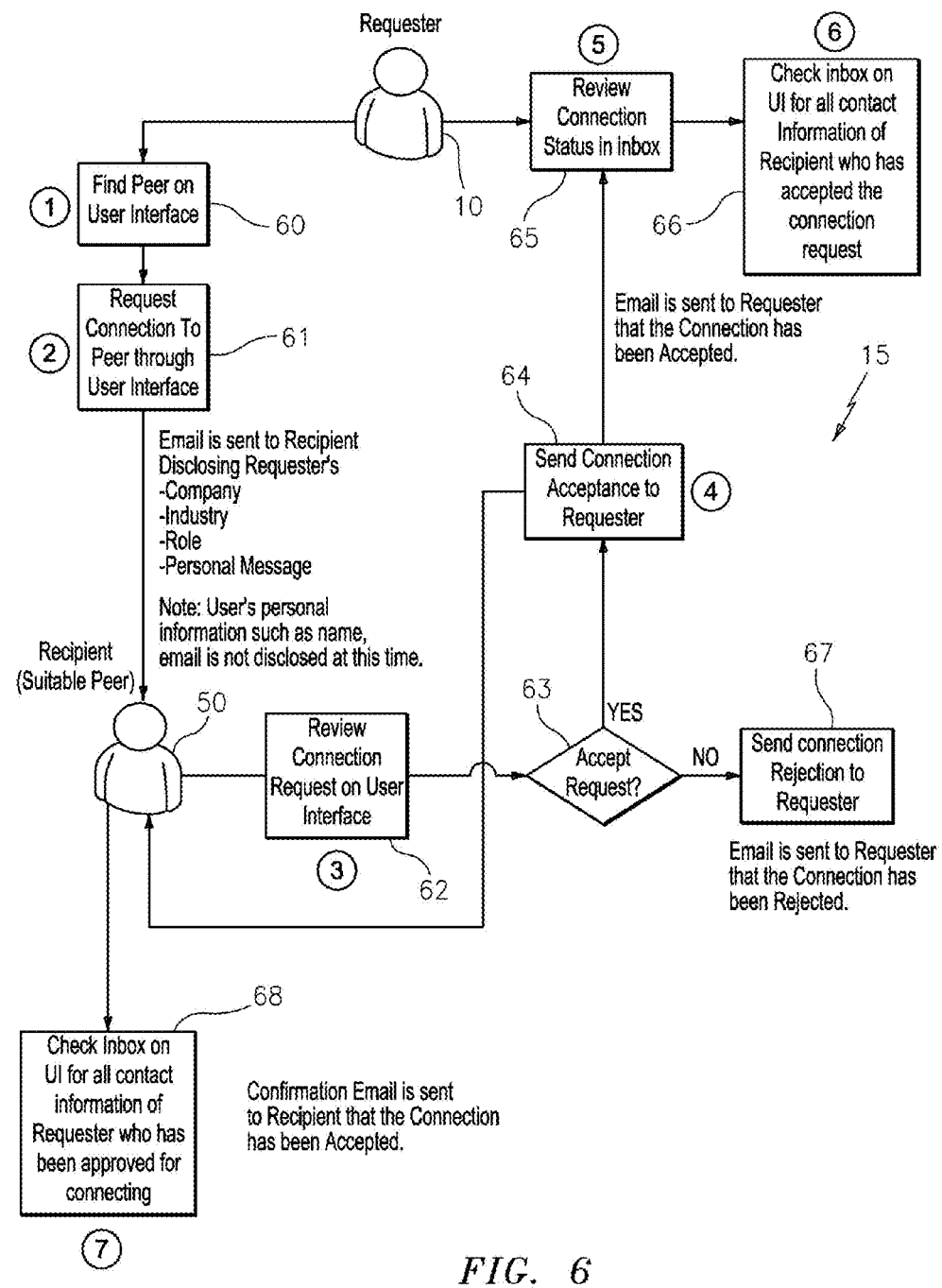
FIG. 6 is a flowchart of an example embodiment of the peer connection algorithm in accordance with the present invention.

FIG. 5 is a block diagram illustrating the connection of a requester to a peer. After going through the peer search process and receiving a list of the best matched peers, as described in connection with FIG. 4, the requester 10 can request connection to one or more peers that have been identified as potentially suitable matches. The request for a connection may be made to the server 12 via the user interface 11 (shown in FIG. 1). A peer connection algorithm 15, described in greater detail in FIG. 6, is associated with the server 12 in order to make a connection request to a particular peer 50 identified by the requester. The connection requests may be made using a progressive disclosure methodology in accordance with the invention, in which the respective parties (peer and requester) only learn of the other's identity after certain requirements have been met.

As indicated in FIG. 6, the requester 10 first uses the user interface to find a potential peer to contact, as indicated at box 60. A request for a connection to that peer is then made, again via the user interface as indicated at box 61. The peer connection algorithm 15 (FIG. 5) then sends an email (or other electronic message including but not limited to text, instant message, social media message, or the like) to the recipient peer indicating that someone wants to contact the recipient and disclosing various information about the requester such as, for example, the requester's company, industry, role in the company/industry and a personal message from the requester. The requester's personal information, such as name, email address, etc. may or may not be disclosed at this time.

Upon receipt of the message, the recipient peer 50 reviews the connection request using a provided user interface, as indicated at box 62. If the recipient decides not to accept the request for a connection with the requester (box 63), a connection rejection is sent as indicated at box 67. This rejection can comprise a message sent to the requester that the connection has been refused. The system can keep a record to note that the recipient peer has rejected a communication, which record can be used to provide a corresponding bias with respect to that recipient peer (as described in connection with box 52 of FIG. 4) should that recipient continue to refuse connections when contacted.

If the recipient peer 50 accepts the request for a connection, a connection acceptance is sent to the requester 10, as indicated at box 64. The acceptance can comprise a message sent to the requester indicating that the connection has been accepted. A record can be kept by the system regarding the acceptance by the particular recipient peer, for future use in providing a corresponding bias as described in connection with box 54 of FIG. 4.

Upon acceptance of the connection request by the recipient, an introductory message is sent by the application on server 12 to both the recipient and requester with the contact information of both parties. Alternatively, the requester can also review the connection status (box 65) and obtain contact information of the recipient peer via the user interface (box 66). At this point, the requester can directly contact the recipient peer to commence a business relationship. For example, the requester can ask the recipient peer to provide advice and/or assistance in a particular technology or subject area, or to collaborate on a project that the requester is working on. In one embodiment of the system, the recipient peer 50 will be able to obtain contact information for the requester via his user interface, as indicated at box 68, as soon as the connection has been accepted by the recipient peer.

Figure 7:
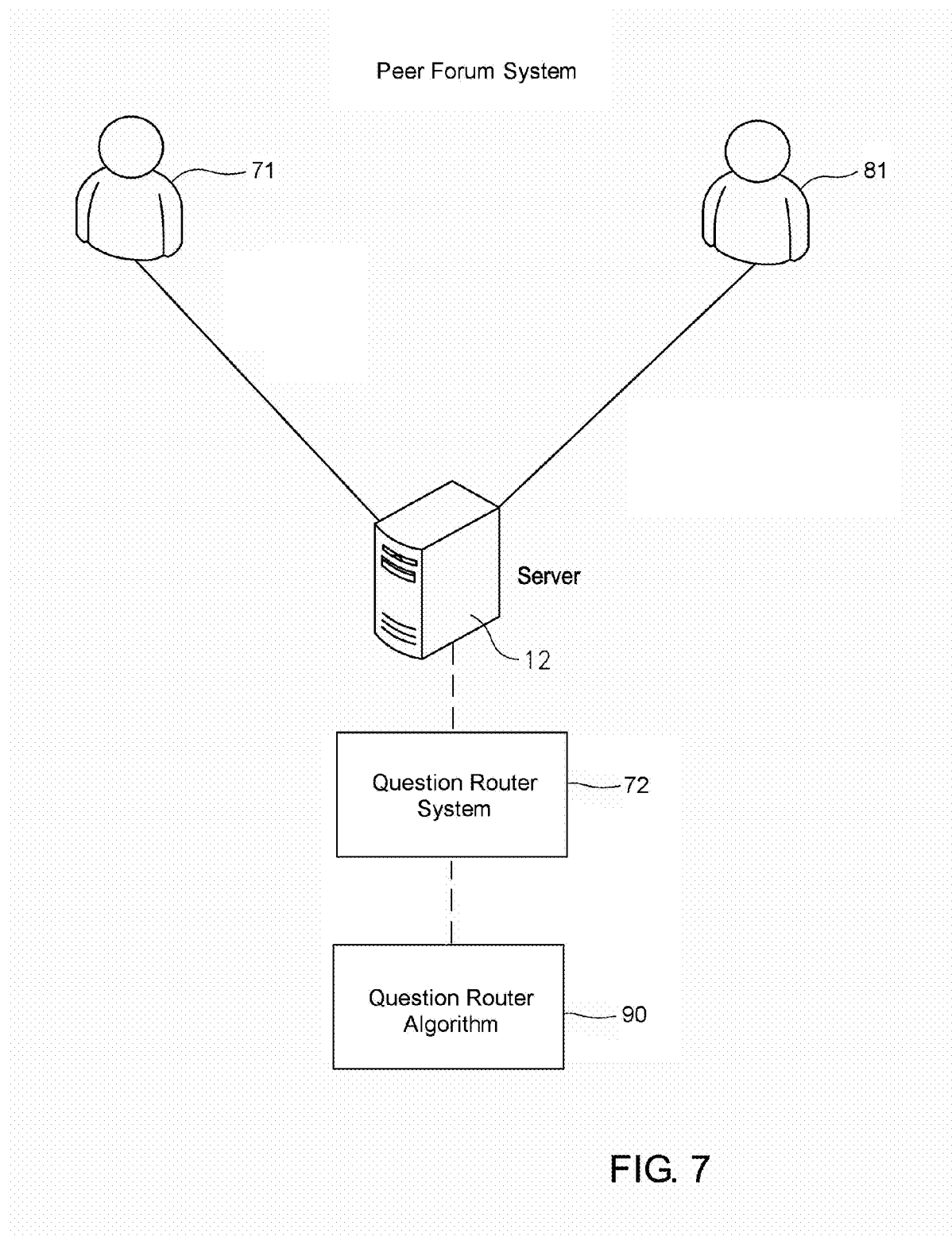
FIG. 7 is a block diagram of components of an example embodiment of the peer forum system of the present invention.

FIG. 7 is a block diagram illustrating a peer forum system of the present invention. The peer forum system is designed to make asking questions and answering questions easy and quick. In a preferred embodiment, the process is automated and resident on the server 12, and there is no substantial human intervention. In the peer forum system, clients 71 utilize a user interface to access online forums that are restricted to a qualified set of individuals. The clients 71 register, provide profile information, and login to access the forums. The clients can then ask questions and obtain answers from a highly qualified set of individuals, namely peer experts 81. The peer experts answer questions when they visit the peer forums. The peer forum system also consists of the question router 72, which operates via a question router algorithm 90. The question router helps to automatically route the questions to relevant peers. Routing the questions automatically helps the forum system to increase the question and answer rates without any manual intervention by the community managers.

Figure 8:
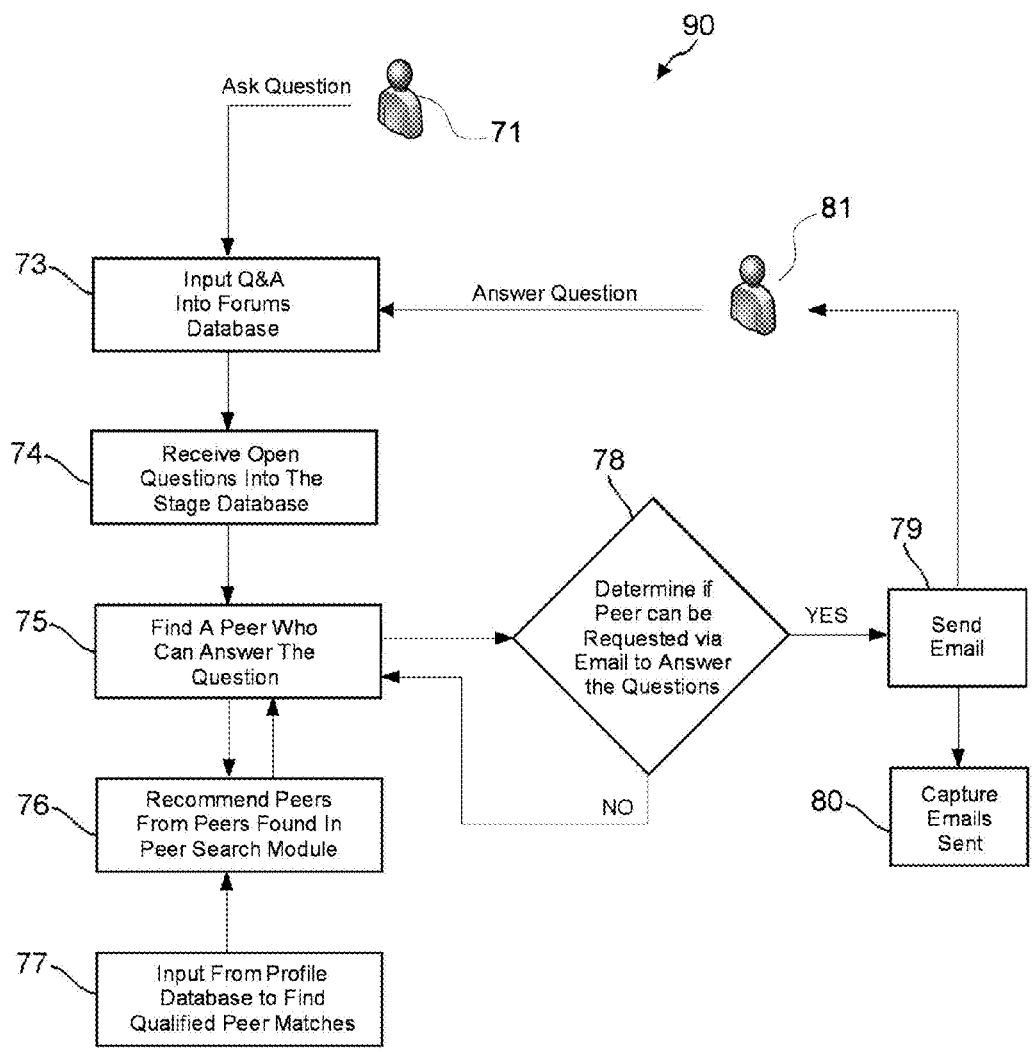
FIG. 8 is a flowchart of an example embodiment of a question routing algorithm of the question router in accordance with the present invention.

FIG. 8 is a flowchart illustrating the operation of the question router algorithm 90. The client 71 accesses the question router algorithm 90 through the question router 72. Questions are input, as indicated at box 73, into a forums database that captures all the questions input by clients. Also, answers to questions are input by peer experts 81 into the forums database. At any given point in time, questions or answers can be looked up in the forums database.

Open questions in the forums database are then received into a stage database, as indicated at box 74. Open questions are questions for which there have been no answers or replies. A reply may not constitute an answer and may simply be a request for additional information. Unanswered questions from the forums database are received into the stage database on a periodic basis, for example, every few minutes, every few hours, or every few days. It is also possible to pull all questions (open or not) and all answers and replies on a periodic basis.

The open questions from the stage database 74 are then received into a peer search module, as indicated at 75, to find peer experts 81 (users) who can answer the questions. The peer search module is operatively associated with a recommendation engine, which recommends peers, as indicated at box 76, from the peer search module who can best answer the questions. This is accomplished e.g., using a combination of collaborative and cluster filtering algorithms. The recommendation engine takes into consideration both the explicit and implicit profiles of a peer to figure out the peer's subject matter expertise. The recommendation engine also takes into account the propensity to answer questions on the peer forum systems and the subject matter expertise the peers demonstrate on the peer forum system. If the peer's subject matter expertise is the same as the open question, then the peer becomes a candidate to answer the open question.

Input is provided to the recommendation engine via a profile database, as indicated at box 77, so that qualified peer matches can be found. The profiles database stores an explicit and an implicit profile of the peer expert 81. An explicit profile comprises information that generally defines the peer expert 81 based on his own input. This is usually derived from registration forms where the peer expert 81 has input his industry experience, job titles and duty descriptions, size of company, company name, projects he is working on, vendors he is working with, etc., as discussed in detail above in connection with FIG. 2. The implicit profile of the peer expert 81 is based on the user's tracked behavior on one or more electronic devices and/or on a web site through which the present system is accessed. The implicit profile is described in detail below in connection with FIG. 9.

After receiving open questions into the peer search module and receiving the peer recommendation from the recommendation engine, a determination is then made (box 78) using rules regarding whether or not a candidate peer expert 81 recommended and entered into the peer search module can be sent an electronic message encouraging the peer expert 81 to answer the open questions. There might be rules that limit the number of messages that a peer expert 81 can receive, such as "only send three emails per person per week." The rules can include any number of criteria such as whether a peer expert is likely to answer questions, a peer has unsubscribed to these messages, whether a peer expert is in the same industry, etc. The peer experts 81 who can get past these rules become eligible to be sent messages, requesting them to answer the questions. If a peer expert 81 cannot get past the rules, the next best peer expert is selected for answering the questions. The message can be sent to one or more peer experts as per the configuration of the system.

If a peer expert 81 can pass the rules, a message delivery system, for example an email delivery system, sends an email, as indicated at box 79, to the peer expert 81 requesting him to answer the open questions. The email delivery system consists of email templates and email sending systems. A touch database captures all the sent emails sent to the peer experts 81, as indicated in box 80. The data from the touch database and indicative of the emails sent to the peer experts 81 will be used in the future to determine the number of emails sent to peer experts 81 and to adjust the rules.

Peer experts 81 open the emails they receive from the email delivery system and find questions they can answer. In a preferred embodiment, these emails include links which will take the peer experts 81 to the open question where they can comment on or answer the question. Although the example embodiment of the invention is described in connection with email messaging, other electronic messaging systems may be used with the present invention, including but not limited to text messaging, instant messaging, social media messaging, and the like.

The interactive peer directory system enables professionals to find suitable peers for assistance with, advice on, and/or collaboration on a particular project. Although the peers are generally people that work for other companies or are independent consultants, academics, or the like, they can also be employed by the same company as the requester.

As discussed above in connection with FIG. 1, a user interface enables the explicit user profile information to be entered and stored in a profiles database 14. A search engine appends tags to the user profile information. A search index 16 associated with the search engine stores tagged user profile information in an indexed form. Implicit profile information may also be stored in profiles database 14 and tagged and indexed in the peers profiles search index 16 in the same manner as the explicit profile information is stored, tagged and indexed. A peer relevancy algorithm associated with the search engine searches for candidate peers among the indexed user profile information stored in the search index. The peer relevancy algorithm assigns weights to candidate peers based on different categories of the indexed user profile information, and selects peer matches based on the assigned weights.

Once the system provides one or more potential peer matches to the requester, the requester can initiate a connection request to a selected peer. If the selected peer accepts the connection request, the requester can contact the peer directly. In order to provide matches that are most likely to accept a connection request, the system can keep track of which candidate peers have a history of accepting requests to connect and which have a history of refusing to connect. The list of potential matches provided to the requester can be biased to favor those that have a tendency to accept connection requests.

Moreover, question and answer rates can be increased in accordance with the invention to maintain a dynamic and healthy community of users. To achieve this, open questions are pulled from forums and a recommendation engine is used to find peer experts to answer the open questions. Emails or notifications are then sent to the peer experts to solicit their response to the questions.

In a further example embodiment of the present invention, methods and systems for creating an implicit profile for use by a recommendation engine or a question router 112 are provided. FIG. 9 shows a block diagram of an example embodiment of an automated system for creating an implicit profile for use by at least one of a recommendation engine or a question router 112. Each user may employ one or more electronic devices 100. A tracking application 102 may be provided on each electronic device 100 (e.g., as a downloadable application). It should also be appreciated that the tracking application may alternatively or additionally comprise a software application integral to the web interface of the question router or recommendation engine 112, a cloud based application, or a web-based tracking application residing on the network 104 or other component of the system. The tracking application 102 may track user behavior on at least one of the one or more electronic devices 100 and on an electronic communications network 104. One or more information databases 106 may be provided for storing user-related information relating to the user behavior. An analyzer 110 may be provided for analyzing the user-related information relating to the user behavior received or obtained from the one or more databases 106 in order to extract or derive key words therefrom which are used to characterize user interests, expertise, and skills. A profiles database 114 is provided for storing the key words as the implicit profile 116. The key words are used by the recommendation engine or question router 112 when matching a request from a querying user to a potential user or group of users having the relevant background to respond to the request.

The information databases 106, analyzer 110, and profiles database 114 are associated with the recommendation engine/question router 112. FIG. 9 shows the profiles database 114 as part of the recommendation engine/question router 112. However, those skilled in the art will appreciate that the profiles database 114 may be implemented separately from the recommendation engine/question router 112. Similarly, the analyzer 110 and the information databases 106 may be separate from the recommendation engine/question router 112 as shown in FIG. 9, or integrated into the recommendation engine/question router 112. Further, the question router and recommendation engine 112 may be integrated on the same or separate hardware and software platforms and for ease of explanation are illustrated herein as a common device/software application 112.

The user-related information may comprise at least one of search terms used, documents read, documents opened, documents printed, documents saved, documents created, documents edited, documents commented on, annotations entered on documents, highlighted terms in documents, websites visited, webpages viewed, Internet searches conducted, ratings provided by the user on documents, products or services, user-created product or service reviews, multimedia items played, social forum threads opened, social forum threads participated in, people profiles opened, user items shared on the electronic communications network, shared items of others on the electronic communications network accessed by the user, user created content, online events, seminars, training courses, or webinars attended, in-person or online events, seminars, or training courses registered for, news or information feeds set up on the electronic communications network, emails written, emails received, blogs read, blog posts entered, software applications installed, computer hardware installed, software updates downloaded, one or more of alerts, follows, and likes set up on the electronic communications network, and similar information.

In addition, the user-related information may be obtained from user activity on a web site used to access the recommendation engine or the question router 112. For example, the user-related information may comprise at least one of questions answered, answers provided, information and materials reviewed in answering questions, number of questions answered in a subject area, percentage of questions accepted for response, subject matter expertise based on answers submitted, number of times recommended as an expert in a subject area, user frequency of logging in to the web site, user preference for type of digital network, user preference for type of electronic device, user preferred information channels including one or more of reading or printing of documents, use of multimedia, and interacting socially in forums, user open and click-through rates for relevant emails, and similar information.

In addition, the user-related information may comprise at least one of user requests or user responses via the web site used to access the recommendation engine or the question router 112.

Optionally, the user-related information may also comprise user requests submitted to the recommendation engine or the question router 112 via online forms, emails, or computer applications that are recorded in a request database 122 to find at least one of experts, analysts, or peers, or to receive requested information or materials.

Further, the user-related information may comprise user requests submitted to the recommendation engine or the question router 112 or other linked web-based tools via online forms, emails, or computer applications that are recorded in a request database 122 for at least one of vendor proposals, product demonstrations, price quotes, and the like.

The user-related information may also be obtained from electronic imprints from user interaction with the one or more electronic devices 100 that are logged in a database 106. The one or more electronic devices 100 may comprise at least one of a computer, a tablet computer, a laptop, a smartphone, an Internet enabled device, and the like.

The electronic imprints may be created by at least one of using a web interface, using a web browser, using a mobile application, using a computer application or program, sending or receiving an email, logging or recording a telephone call or voice message, manipulation of a self-reporting electronic system, downloading or installing one or more of programs, applications, documents, multimedia content, music, and software updates, and the like. Key words may be derived from the user-related information obtained from the electronic imprints.

The tracking by the tracking application 102 may comprise at least one of storing data from the user behavior at the time of the user behavior, searching the one or more electronic devices 100 for data relating to the user behavior, recording user interaction on the one or more electronic devices 100, and the like.

The tracking application 102 may be a crawling or searching application running on the one or more electronic devices 100 for searching various computer applications or storage locations on the one or more electronic devices 100 for obtaining the user-related information. The tracking may be a continuous process (e.g., enabled by an application running continuously on one or more of the electronic device(s) 100, the cloud, the web interface, the network, and or at the recommendation engine/question router 112, or other suitable location). Alternatively, the tracking may be periodic (e.g., the tracking application, wherever located, may be set to search the electronic device(s) 100 or the network 104 at configurable intervals). The tracking application 102 may also be configurable to automatically search the electronic device 100 when certain events occur, including but not limited to upon startup of the device 100, upon sensing user interaction with the device 100, or upon sensing a configuration change to the device 100, upon the sending or receiving of information, and the like.

The various computer applications may comprise one or more of a word processing application, a web browser, an electronic calendar, an email program, spreadsheet applications, social media applications, messaging applications, content editing, highlighting, and annotating programs, and the like.

The storage locations may comprise at least one of hard drive locations, file folders, document folders, web browser cookie folders, email folders, databases, spreadsheet folders, shared folders, networked folders, music folders, software application folders, media files, file directories, social directories, activity logs, and the like.

Figure 10:
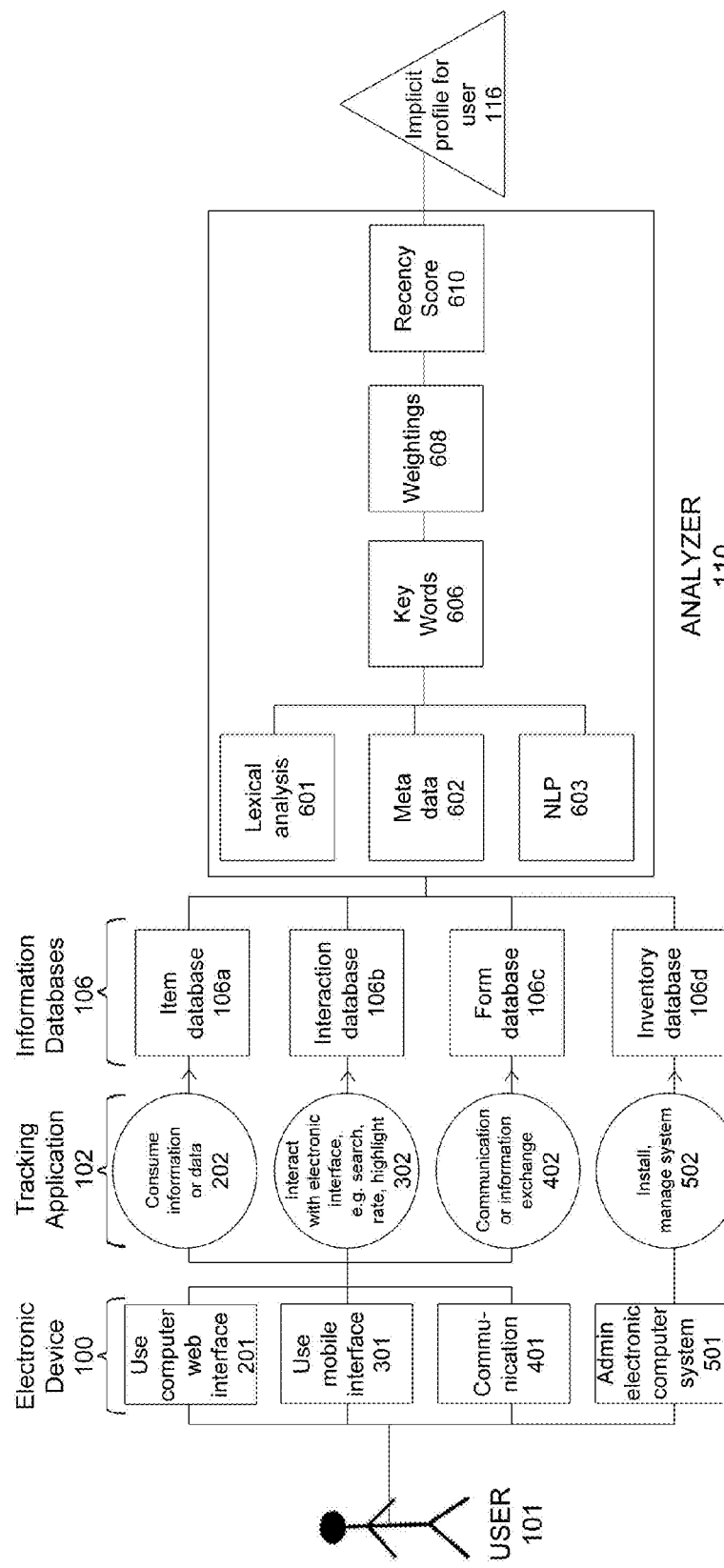
FIG. 10 is a flow diagram illustrating an example embodiment of the creation of an implicit profile in accordance with the present invention.

FIG. 10 illustrates an example embodiment of a process for creating the implicit profile 116 for a user 101. For example, the user 101 may use an electronic device 100 to interact with a computer web interface 201, use a mobile interface 301 (e.g., on a smartphone, tablet computer or other portable electronic device), send a communication or otherwise exchange information from an electronic device 401, or take an administrative action with regard to the electronic device 501, or the like. The tracking application 102 (whether resident on the electronic device 100, within the web interface 201, or cloud or network-based) tracks the user actions and inputs. Any user-related information or data consumed 202, any interactions 302, communications 402, or administrative actions 502 carried out by the user on the electronic device(s) 100 may be respectively stored in an item database 106a, an interaction database 106b, a form database 106c, and an inventory database 106d (all of which may constitute the information databases 106).

The analyzer 110 obtains and analyzes the user-related information from the various information databases 106, 106a, 106b, 106c, and/or 106d. The key words may be extracted or derived from the user-related information by the analyzer 110 by applying at least one of lexical analysis 601, metadata analysis 602, natural language processing analysis 603, or similar processing techniques or combinations thereof. The extracted key words 606 are then stored in the profiles database 114 as an implicit profile 116.

In one example embodiment, weightings 608 may be assigned to the key words by the analyzer 110 and stored with each of the key words in the profiles database 114. The weightings 608 may be assigned based on one or more of relevancy calculations of the user-related information, an estimate of accuracy of the user-related information, type of the user-related information, source of the user-related information, amount of each type of the user-related information, time spent by user on each type or item of user-related information, recency of the user-related information, relation of the user-related information to current key words in the implicit profile, relation of the user-related information to information in an explicit profile of the user, and the like.

Optionally, separate recency scores 610 may be assigned by the analyzer 110 and stored with the key words in the profiles database 114 indicating the relative age of the key words. For example, key words obtained or derived from the same set of user-information will be assigned the same recency score.

The method may further comprise storing an explicit profile 118 for the user 101 in the profiles database 114 together with the implicit profile 116 for use by at least one of the recommendation engine and the question router 112.

The explicit profile 118 may comprise profile data obtained by direct input from the user 101 as described above in connection with FIGS. 1 and 2.

A plurality of the implicit and explicit profiles 116, 118 may be stored for each of a corresponding plurality of respective users 101 in the profiles database 114. The implicit profile 116 of the user 101 may be matched with the explicit profile 118 of the user 101 for use in processing recommendation requests or information requests by the recommendation engine or question router 112.

Optionally, the key words, values, key word weightings, and other information stored in the matching explicit and implicit profiles 116, 118 of the user may be merged to create a merged profile 120 for use by at least one of the recommendation engine and the question router 112. The merged profile 120 may contain key words from both the implicit profile 116 and from the explicit profile 118, with corresponding weightings and (optionally) recency scores. The weightings and/or recency scores of the key words in the merged profile may be adjusted during the merging process. For example, key words present in both profiles 116 and 118 may have weightings adjusted upwards to reflect higher relevance, and where the same key words are present in both the implicit and explicit profiles, the more current recency score is maintained while the older recency score is deleted for those key words.

The question router 112 may be adapted to automatically route a question from a querying user to one or more of the other users on the electronic communications network 104 based on a matching of key words obtained from the question with at least the implicit profiles 116 of the one or more other users.

The recommendation engine 112 may be adapted to accept a recommendation request for an expert from a querying user and recommending one or more of the other users on the electronic communications network 104 as an expert based on a matching of key words obtained from the recommendation request with at least the implicit profiles 116 of the one or more other users.

The method may also comprise providing user feedback on relevancy of at least one of a recommendation request from the recommendation engine, a response to the recommendation request from a recommended peer, a question from the question router, and a response to the question from the recommended peer to the user's expertise, and storing of the feedback. The user's feedback on relevancy may be used to adjust key word weightings 608 in the implicit profile 116 of the user and/or the recommended peer. The feedback may be provided via the electronic device 100 to the recommendation engine/question router 112 via the network 104 and stored at either a dedicated feedback database, or in a designated location in one of the information databases 106 or the requests database 122.

It should now be appreciated that the present invention provides advantageous methods and apparatus for creating an implicit profile for use by a recommendation engine or question router, resulting in more targeted recommendations and responses to user queries.

Although the invention has been described in accordance with various example embodiments, various additional embodiments can be provided and are intended to be included within the scope of the claims.

What is claimed is:

1. An automated method for creating an implicit profile for use by at least one of a recommendation engine or a question router, comprising:

tracking user behavior on at least one of one or more electronic devices and an electronic communications network;

analyzing user-related information relating to the user behavior to extract or derive key words therefrom which are used to characterize user interests, expertise, and skills;

storing the key words in a profiles database as the implicit profile;

storing an explicit profile for the user in the profiles database together with the implicit profile for use by at least one of the recommendation engine and the question router, the explicit profile comprising profile data obtained by direct input from the user;

matching the implicit profile of the user with the explicit profile of the user for use in processing recommendation requests or information requests; and merging the key words, values, key word weightings, and other information stored in the matching explicit and implicit profiles of the user to create a merged profile for use by at least one of the recommendation engine and the question router;

wherein a plurality of the implicit and explicit profiles are stored for each of a corresponding plurality of respective users in the profiles database.

2. The method in accordance with claim 1, wherein the user-related information comprises at least one of search terms used, documents read, documents opened, documents printed, documents saved, documents created, documents edited, documents commented on, annotations entered on documents, highlighted terms in documents, websites visited, webpages viewed, Internet searches conducted, ratings provided by the user on documents, products or services, user-created product or service reviews, multi-media items played, social forum threads opened, social forum threads participated in, people profiles opened, user items shared on the electronic communications network, shared items of others on the electronic communications network accessed by the user, user created content, online events, seminars, training courses, or webinars attended, in-person or online events, seminars, or training courses registered for, news or information feeds set up on the electronic communications network, emails written, emails received, blogs read, blog posts entered, software applications installed, computer hardware installed, software updates downloaded, and one or more of alerts, follows, and likes set up on the electronic communications network.

3. The method in accordance with claim 1, wherein:

the user-related information is obtained from user activity on a web site used to access the recommendation engine or the question router;

the user-related information comprises at least one of questions answered, answers provided, information and materials reviewed in answering questions, number of questions answered in a subject area, percentage of questions accepted for response, subject matter expertise based on answers submitted, number of times recommended as an expert in a subject area, user frequency of logging in to the web site, user preference for type of digital network, user preference for type of electronic device, user preferred information channels including one or more of reading or printing of documents, use of multimedia, and interacting socially in forums, and user open and click-through rates for relevant emails.

4. The method in accordance with claim 3, wherein the user-related information comprises at least one of user requests or user responses via the web site used to access the recommendation engine or the question router.

5. The method in accordance with claim 1, wherein the user-related information comprises user requests submitted to the recommendation engine or the question router via online forms, emails, or computer applications that are recorded in a request database to find at least one of experts, analysts, or peers, or to receive requested information or materials.

6. The method in accordance with claim 1, wherein the user-related information comprises user requests submitted to the recommendation engine or the question router or other linked web-based tools via online forms, emails, or computer applications that are recorded in a request database for at least one of vendor proposals, product demonstrations, and price quotes.

7. The method in accordance with claim 1, wherein the user-related information is obtained from electronic imprints from user interaction with the one or more electronic devices that are logged in a database.

8. The method in accordance with claim 7, wherein the one or more electronic devices comprise at least one of a computer, a tablet computer, a laptop, a smartphone, and an Internet enabled device.

9. The method in accordance with claim 7, wherein the electronic imprints are created by at least one of using a web interface, using a web browser, using a mobile application, using a computer application or program, sending or receiving an email, logging or recording a telephone call or voice message, manipulation of a self-reporting electronic system, and downloading or installing one or more of programs, applications, documents, multimedia content, music, and software updates.

10. The method in accordance with claim 1, wherein the key word weightings are assigned and stored with each of the key words in the profiles database.

11. The method in accordance with claim 10, wherein the key word weightings are assigned based on one or more of relevancy calculations of the user-related information, an estimate of accuracy of the user-related information, type of the user-related information, source of the user-related information, amount of each type of the user-related information, time spent by user on each type or item of user-related information, recency of the user-related information, relation of the user-related information to current key words in the implicit profile, and relation of the user-related information to information in the explicit profile.

12. The method in accordance with claim 1, wherein the tracking comprises at least one of storing data from the user behavior at the time of the user behavior, searching the one or more electronic devices for data relating to the user behavior, and recording user interaction on the one or more electronic devices.

13. The method in accordance with claim 1, wherein the tracking is enabled via a crawling or searching application running on the one or more electronic devices for searching various computer applications or storage locations on the one or more electronic devices for obtaining the user-related information.

14. The method in accordance with claim 13, wherein the various computer applications comprise one or more of a word processing application, a web browser, an electronic calendar, an email program, spreadsheet applications, social media applications, messaging applications, and content editing, highlighting, and annotating programs.

15. The method in accordance with claim 13, wherein the storage locations comprise at least one of hard drive locations, file folders, document folders, web browser cookie folders, email folders, databases, spreadsheet folders, shared folders, networked folders, music folders, software application folders, media files, file directories, social directories, and activity logs.

16. The method in accordance with claim 1, wherein the key words are extracted or derived from the user-related information by applying at least one of lexical analysis, metadata analysis, and natural language processing analysis.

17. The method in accordance with claim 1, wherein the question router automatically routes a question from a querying user to one or more of the other users on the electronic communications network based on a matching of key words obtained from the question with at least the implicit profiles of the one or more other users.

18. The method in accordance with claim 1, wherein the recommendation engine accepts a recommendation request for an expert from a querying user and recommends one or more of the other users on the electronic communications network as an expert based on a matching of key words obtained from the recommendation request with at least the implicit profiles of the one or more other users.

19. The method in accordance with claim 1, further comprising:
providing user feedback on relevancy of at least one of a recommendation request from the recommendation engine, a response to the recommendation request from a recommended peer, a question from the question router, and a response to the question to the user's expertise, and
storing the feedback.

20. The method in accordance with claim 19, where the user's feedback on relevancy is used to adjust the key word weightings in the implicit profile of at least one of the user or the recommended peer.

21. A system for creating an implicit profile for use by at least one of a recommendation engine or a question router, comprising:
an electronic communications network;
one or more electronic devices for each user in communication with the electronic communications network;
a software application running on each of the electronic devices for tracking user behavior on at least one of the one or more electronic devices and the electronic communications network;
one or more information databases for storing user-related information relating to the user behavior;
an analyzer associated with the one or more databases and at least one of the recommendation engine or the question router for receiving and analyzing the user-related information relating to the user behavior and extracting or deriving key words therefrom for use in characterizing user interests, expertise, and skills; and
a profiles database associated with at least one of the recommendation engine or the question router for storing the key words as the implicit profile;
wherein:
an explicit profile for the user is stored in the profiles database together with the implicit profile for use by at least one of the recommendation engine and the question router, the explicit profile comprising profile data obtained by direct input from the user;
the implicit profile of the user is matched with the explicit profile of the user for use in processing recommendation requests or information requests;
the key words, values, key word weightings, and other information stored in the matching explicit and implicit profiles of the user are merged to create a merged profile for use by at least one of the recommendation engine and the question router; and a plurality of the implicit and explicit profiles are stored for each of a corresponding plurality of respective users in the profiles database.

\* \* \* \* \*